United States Patent [19]

Taylor

[11] Patent Number: 4,562,979
[45] Date of Patent: Jan. 7, 1986

[54] EXPANDABLE SPACECRAFT

[75] Inventor: Thomas C. Taylor, P.O. Box 1547, Wrightwood, Calif. 92397

[73] Assignees: Aeritalia, Torino, Italy; Thomas C. Taylor, Wrightwood, Calif.

[21] Appl. No.: 477,482

[22] Filed: Mar. 21, 1983

[51] Int. Cl.⁴ .............................................. B64G 1/12
[52] U.S. Cl. ................................ 244/158 R; 244/159; 220/8
[58] Field of Search ................... 244/158 R, 159, 162; 114/312, 330, 331, 333, 125; 52/67; 220/8

[56] References Cited

U.S. PATENT DOCUMENTS

| | | | |
|---|---|---|---|
| 1,573,071 | 2/1926 | Kaye | 220/8 |
| 2,712,394 | 7/1955 | Koschatzky et al. | 220/8 |
| 3,108,924 | 10/1963 | Adie | 244/117 R |
| 3,210,026 | 10/1965 | Frisch | 244/159 |
| 3,389,877 | 6/1968 | Huber et al. | 244/158 R |
| 3,539,070 | 11/1970 | Dunlea, Jr. | 244/137 R |
| 3,659,108 | 4/1972 | Quase | 250/108 FS |
| 3,864,771 | 2/1975 | Bauer | 220/8 |
| 4,115,656 | 9/1978 | Aitel | 52/67 |
| 4,132,373 | 1/1979 | Lang | 244/159 |

FOREIGN PATENT DOCUMENTS 314354  9/1919  Fed. Rep. of Germany ...... 244/125
599255  10/1959  Italy ........................................ 220/8

OTHER PUBLICATIONS

Erno Brochure re: Spacelab, Erno-USA, Inc., Arlington, VA.
Excerpt from *Interavia* re "Manned Earth Satellites" (*Interavia* No. 7/1960), pp. 860–862.
Martin Marietta, "Large Space Telescope".

*Primary Examiner*—Trygve M. Blix
*Assistant Examiner*—Rodney Corl
*Attorney, Agent, or Firm*—Sandler & Greenblum

[57] ABSTRACT

An expandable spacecraft is provided which includes at least one main generally cylindrical body member. This body member comprises a generally waffle-type structure which includes a plurality of flanges extending generally radially from the body member. An auxiliary housing is provided which is adapted to increase the volume of the body member. The auxiliary housing is connected to the main body member and is slidably and telescopically received therein. The main body portion and auxiliary housing member can be provided in a compact state with a predetermined volume or can be expanded by extending the housing outwardly from the main body member to increase the volume of the assembly to a desired degree.

21 Claims, 10 Drawing Figures

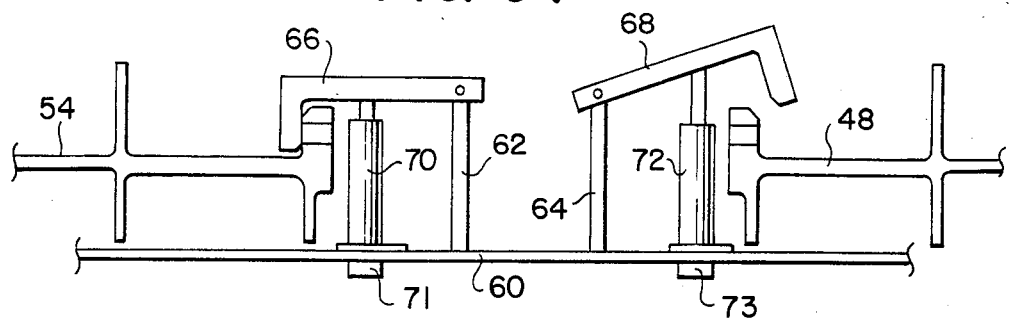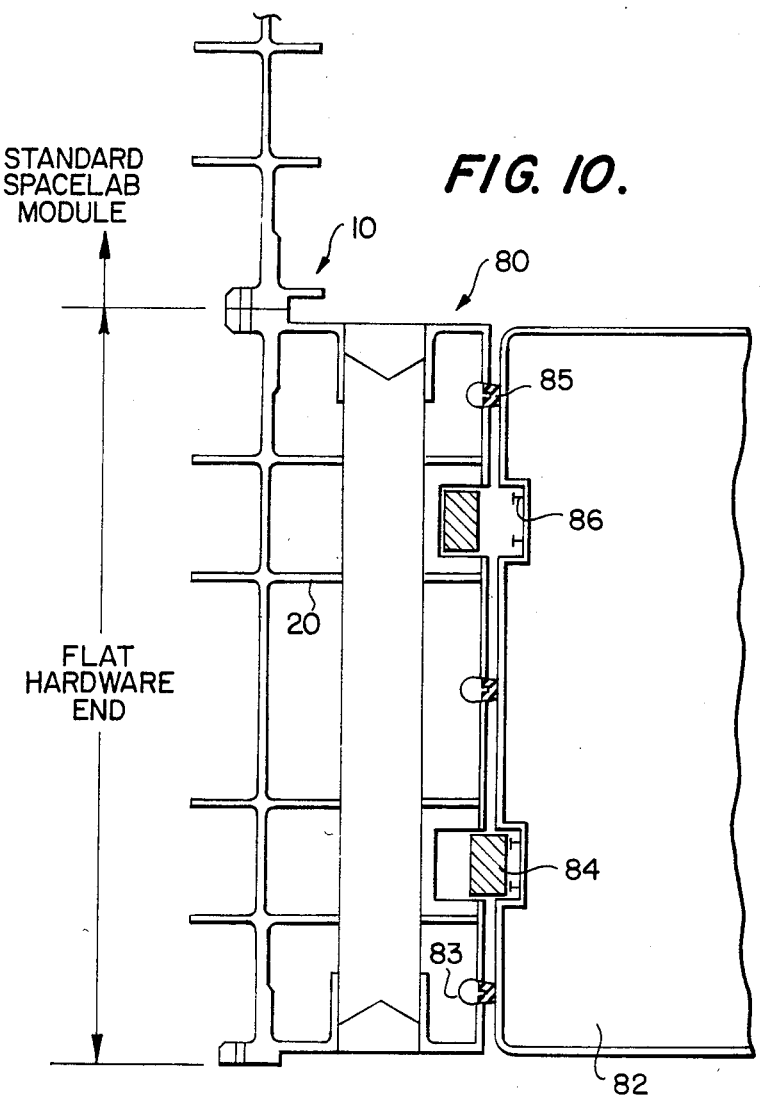

EXPANDABLE SPACECRAFT

BACKGROUND OF THE INVENTION

1. Field of the Invention

The present invention relates generally to an expandable spacecraft, and more particularly to an expandable spacelab-type module arrangement which is adapted to expand the volume of a spacecraft once it is in orbit in space.

2. Discussion of Prior Art

Several previous attempts have been made to provide spacecraft having expandable volume.

FRISCH, U.S. Pat. No. 3,210,026, discloses an orbiting space platform which includes a telescopic arrangement for providing access from outer cabins to a central cabin. The telescopic arrangement can be expanded when the platform is disposed in orbit, e.g., by internal pressure, in order to increase the volume or area between the outer cabins. A space platform is illustrated in both its retracted and expanded conditions, respectively. A telescopic arrangement includes separate telescoping portions which comprise an inner telescopic member and an outer telescopic member, both of which are tubular, and which are slidable with respect to each other. Sliding motion between the inner and outer telescopic members is guided by an annular flange portion of the outer member. The outer telescopic member can be sealed relative to the inner telescopic member by, e.g., gaskets.

HUBER et al., U.S. Pat. No. 3,389,877, disclose an inflatable tether adapted for use in an orbiting spacecraft. The tether device can be provided in a compact condition, and includes a pair of rigid housing sections and a tubular casing formed of flexible fabric material, e.g., neoprene. An inflating apparatus, e.g., a metallic pressure vessel filled with a compressed gas, is encased within a housing section. When a shut-off valve is opened, a supply of pressurized gas fills the inflatable structure and thus the flexible casing is extended to form an elongate, semi-rigid column. The tether device can be stored in a small volume, or can be inflated to maintain a desired separation distance between an orbiting spacecraft and an orbiting booster rocket. It also provides an additional passageway between space vehicles.

BAUER, U.S. Pat. No. 3,864,711, discloses a storable capsule-type device adapted to be used in underwater low-buoyancy systems, or as a low-cost shelter for instruments and personnel during lunar or space exploration. The apparatus can be provided in a compact and an expanded form, and is furnished for transport to a site in its compact position, in which successively smaller-diameter cylindrical wall portions are connected by a plurality of annular folds. When a source of pressurized fluid is applied to the interior of the device, e.g., by opening a valve, the structure unrolls. This provides an expandable capsule which is air-tight, and which is adapted to buoyantly support a desired payload.

LANG, U.S. Pat. No. 4,132,373, discloses a manned spaceflight body which comprises an apparatus with connecting plates adapted to connect two body sections. The plates extend outwardly from the rear of a transporter to connect the spacecraft to a space station.

DORNIER, German Pat. No. 314,354, discloses an apparently expandable aircraft having a plurality of telescoping sections, all of which decrease in diameter.

DUNLEA, Jr., U.S. Pat. No. 3,539,070, discloses a telescoping apparatus which comprises a protective chamber for helicopters and similar vehicles. A rescue chamber incorporates a main body portion and telescoping sections of slightly and successively increasing diameters. Each section cooperates with a downwardly-facing channel and a heavy spring.

QUASE, U.S. Pat. No. 3,659,108, discloses a floatable container which can occupy both a collapsed condition and an expanded condition. The collapsible container comprises a plurality of telescoping sections and a fluid inlet which is adapted to pump fluid into the collapsed container, or to withdraw fluid material from the inflated container. Various sealing rings, e.g., magnetic rings or O-rings, can be used to effect a seal between sections.

A publication by ERNO discloses a variety of potential configurations for the Spacelab module.

Finally, page 860 of "Manned Earth Satellites" discloses a semi-rigid manned satellite which can be packed into a small space in a tip of a carrier rocket, and then inflated when in orbit. In this fashion, the space required for a payload in the carrier vehicle can be reduced to a minimum to reduce the diameter of and drag on, the carrier rocket, and also to bring the center of gravity and center of thrust closer together.

None of these devices, however, operates in the same fashion with the same structure as the present device.

The Spacelab module comprises an aluminum cylinder having conically shaped ends; the module shell and its thermal systems are adapted to be carried into low earth orbit by the U.S. Space Shuttle. The shell utilized is formulated from lightweight materials and includes a waffle-type design, a portion of which is illustrated in FIGS. 2, 4, 7, 9 and 10 of the present invention. The Spacelab shell is formed from modular components; a deployable payload which is not attached to the Spacelab module can be removed from the cargo bay of the Space Shuttle, and the module can then be elongated into the deployable payload volume using the present invention.

SUMMARY OF THE INVENTION

It is a general object of the present invention to provide a new and improved expandable Spacelab module which is capable of being boosted into orbit in a compact state and which can be expanded when in orbit to increase the available volume.

Another object of the present invention is to provide a new and improved expandable Spacelab module in which elongation can be achieved by a plurality of means, e.g., by pneumatic pressure, mechanical means, or hydraulic means.

A further object of the present invention is to provide a new and improved expandable Spacelab module which is adapted to provide larger payload bays for carrying increased payloads in space, particularly in commercial applications.

Still another object of the present invention is to provide a new and improved expandable Spacelab module which decreases the overall cost of establishing predetermined orbiting volumes.

Yet another object of the present invention is to provide a new and improved expandable Spacelab module which can be adapted for use with conventional external tanks to provide complete commercial orbital services.

A further object of the present invention is to provide a new and improved expandable Spacelab module which can double the habitable space of orbiting spacecrafts, reduce the cost of manufacturing spacecraft of predetermined volumes, is lightweight, and which is easily expandable and contractable.

A further object of the present invention is to provide a new and improved Spacelab Module which can be transported to orbit, removed and expanded, attached to another item in orbit and allowed to remain.

The above and other objects, features and advantages of the present invention will become more fully apparent to one of ordinary skill in the art to which this invention pertains from the following detailed description, when taken in conjunction with the accompanying drawings.

The present invention is provided for in one aspect thereof by an expandable spacecraft module which comprises at least one main body member. The main body member has a generally cylindrical configuration and comprises a waffle-type structure which includes a plurality of flanges extending generally radially from the body member. An auxiliary housing is adapted to increase the volume of the body member, and the module includes means for connecting the housing to the body member. The connecting means are attached to a plurality of the flanges. Sealing means for sealing the module from the exterior or environment are also provided.

BRIEF DESCRIPTION OF THE DRAWINGS

The above and other objects, features, and advantages of the present invention will become more fully apparent to those of ordinary skill in the art to which the present invention pertains from the following detailed description, taken in conjunction with the accompanying drawings, in which:

FIG. 9 is another embodiment of a latching mechanism adapted to control the position of the main body member with respect to the inner cylinder; and FIG. 10 illustrates an alternative embodiment of the present invention in which the expandable auxiliary housing is attached to flanges which are directed radially outwardly from the generally cylindrical main body member, rather than attached to flanges directed radially inwardly from the interior of the main body member.

DETAILED DESCRIPTION OF THE DRAWINGS

Figure 1:
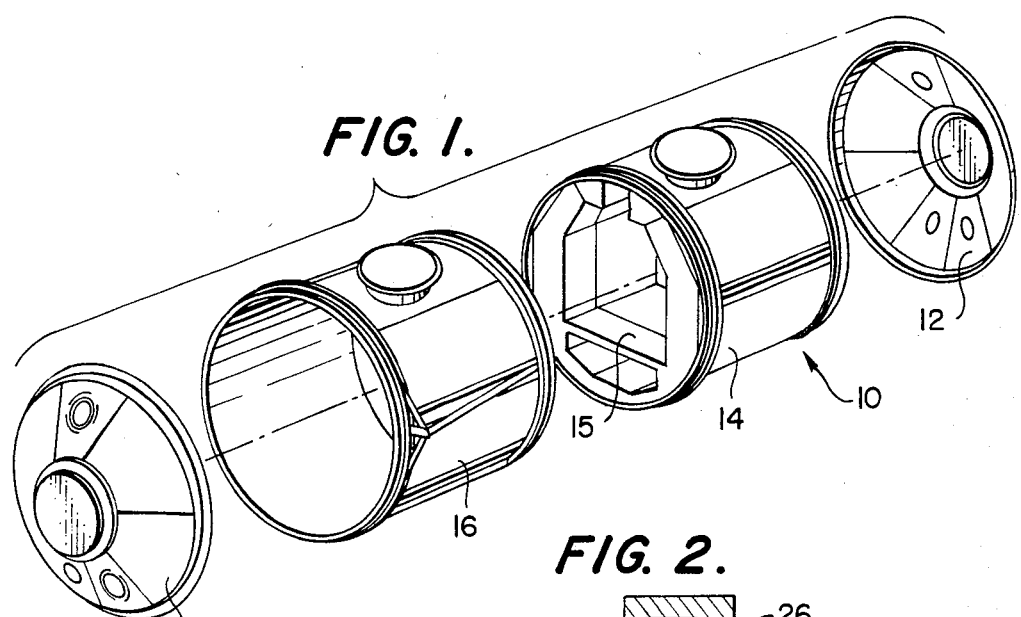
FIG. 1 is an exploded perspective view of a conventional Spacelab module without expansion capabilities.

Referring now more specifically to FIG. 1, a conventional Spacelab module 10 is illustrated. This module includes a forward cone or cap portion 12, a forward cylindrical body portion 14, an aft cylindrical body portion 16, and an aft cone or cap portion 18. As seen in FIG. 1, rack 15 is positioned within forward cylinder 14. The rack structure need not have the configuration illustrated in FIG. 1, but can be arranged in any variety of desired fashions to provide the structural, e.g., strength, or storage features required.

Figure 2:
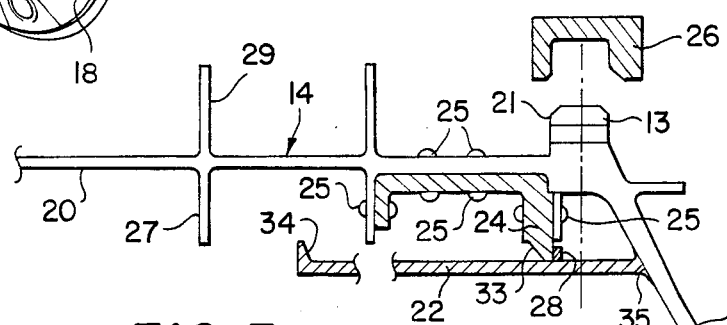
FIG. 2 is a partial sectional view of a portion of a waffle-type main body portion of the Spacelab module of FIG. 1 with a telescopic expandable portion in accordance with the present invention.

As stated above, the main object of the present invention is to provide apparatus for increasing the volume of the Spacelab module when in orbit. Two cylindrical body portions 14 and 16, or any other number of cylindrical body portions which are desired (any number being combinable in a single structure) are each formed from a generally waffle-type construction 20 which includes a plurality of radially inwardly directed flanges 27 and a plurality of radially outwardly directed flanges 29. Each body member also includes an outer closure flange 21, which is adapted to mate with an outer flange 13 of forward frustoconical cap 12, as best illustrated in FIG. 2. In the contracted condition of the expandable structure, as shown in FIG. 2, a manually releasable clamp 26 is positioned over flanges 13 and 21 to maintain body member 14 and cap 12 in assembled condition. In this condition, the volume of the space module is defined by the caps at both ends of the module and the volume of the cylinders which are provided, e.g., forward and aft cylinders 14 and 16, and forward and aft caps 12 and 18, respectively.

The expandable portion of the module comprises a generally cylindrical telescoping shell 22. This shell is slidably positioned within the body portion when clamp 26 is positioned over flanges 13 and 21. When the clamp is removed, cap 12 is separated from cylinder 14, and telescoping shell 22 slides rightwardly, as viewed in FIG. 2, until its angled foot portion 34 comes into abutment with complementarily shaped angled portion 33 of generally annular brace member 24. The annular brace member is attached, e.g., by rivets 25 along three sides thereof, to the interior surface of the outer cylindrical member 14 between adjacent flanges 27. A seal, e.g., annular gasket 28, is provided at the intersecting surface of shell 22 and annular brace 24. The shell is attached at 35 in a conventional fashion, e.g., by welding, to the interior surface of generally frustoconical cap member 12. In this fashion, when the clamp is removed and the cap and shell moved rightwardly, as viewed in FIG. 2, shell 22 will form an integral extension of the volume of forward cylinder 14.

Figure 3:
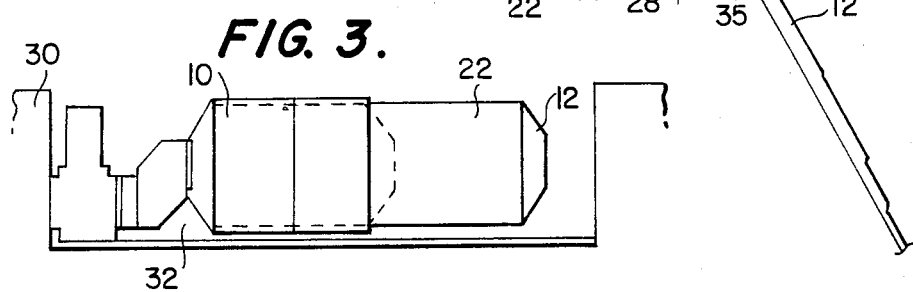
FIG. 3 is a schematic view of the Spacelab module of FIG. 2 when in its expanded condition.
Figure 4:
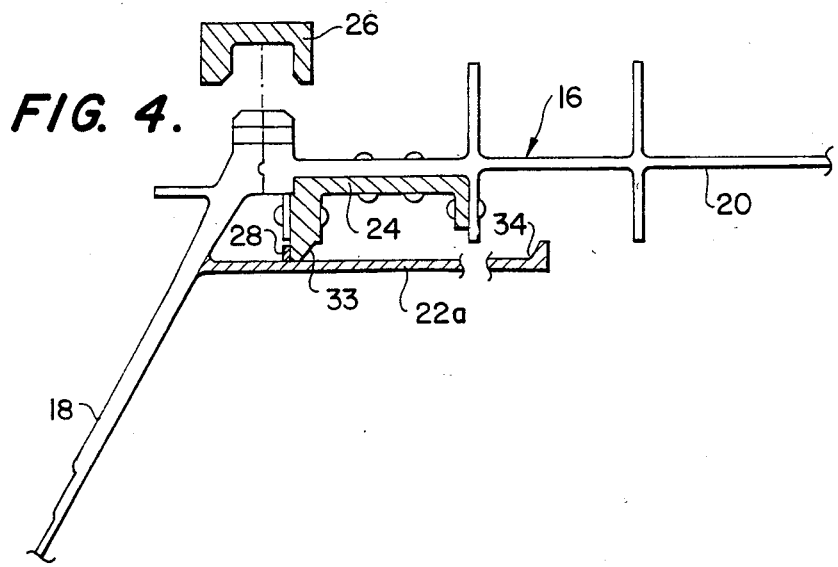
FIG. 4 is a mirror image of the structure illustrated in FIG. 2, illustrating the aft rather than the forward portion of an expandable Spacelab module in accordance with the present invention.

FIG. 3 illustrates the structure of FIG. 2 in schematic fashion in its expanded condition, in which shell 22 and cap 12 extend outwardly from Spacelab shell 10. Although FIG. 3 illustrates only one telescoping shell 22, a plurality of such telescoping shells could be utilized at either end of Spacelab module 10. For example, as shown in FIG. 4, an identical shell structure 22a is provided which is adapted to telescope outwardly from aft cylinder 16. This telescoping cylinder 22a is attached to generally frustoconical abt cap member 18.

Accordingly, the expandable Spacelab module can be provided at either or at both ends with telescoping inner cylinders or shells 22 or 22a, respectively. When the inner telescoping member is fully extended outwardly from aft and forward cylinders 14 or 16, respectively, angled feet portions 33 and 34 of the telescoping shell 22 and annular brace 24, respectively, are engaged in sealing relationship. Annular seal, e.g., gasket 28, is provided to insure that the entire expandable assembly is sealed from its environment, just as the assembly is sealed from its environment in its compact condition. Clamp 26 maintains the respective frustoconical caps and the forward and aft cylinders together.

Figure 5:
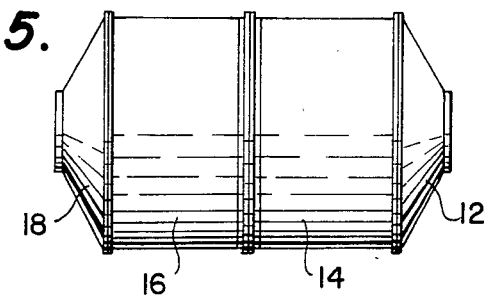
FIG. 5 illustrates the Spacelab module of FIG. 1 with expandable structure in accordance with the present invention and as illustrated in both FIGS. 2 and 4, in its contracted condition.
Figure 6:
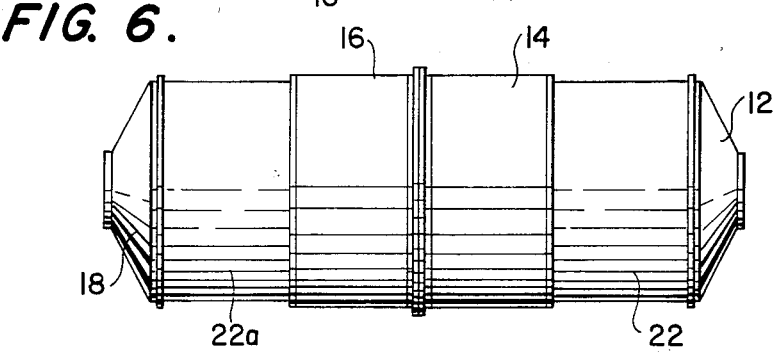
FIG. 6 illustrates the expandable Spacelab module of FIG. 5 in its expanded condition.

FIGS. 5 and 6 illustrate the telescopically expandable Spacelab module in both its contracted and expanded condition; in FIG. 6 the module is shown with telescopically extending shells protruding from both the forward and aft cylinders. As is clear from FIG. 5, forward cap 12 is attached to forward cylinder 14, which is in turn connected to aft cylinder 16 and aft frustoconical cap 18. As seen in FIG. 6, when clamp 26 is released, telescoping shells 22 and 22a extend from forward and aft cylinders 14 and 16, respectively, to approximately double the volume of the module in its compact condition.

Figure 7:
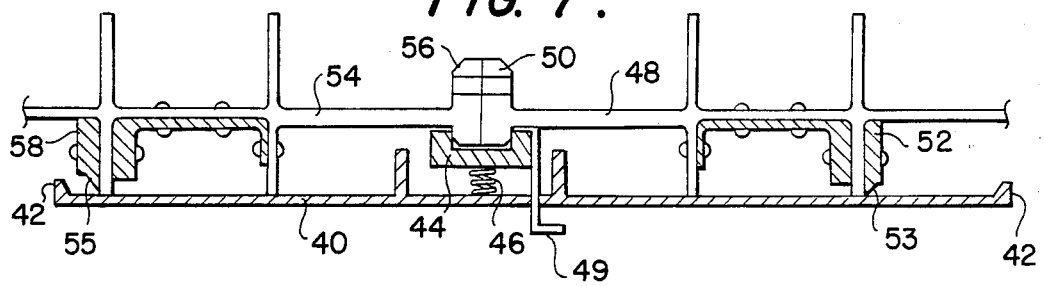
FIG. 7 is a sectional view of a second embodiment of a latching mechanism for maintaining the Spacelab module in its contracted condition.
Figure 8:
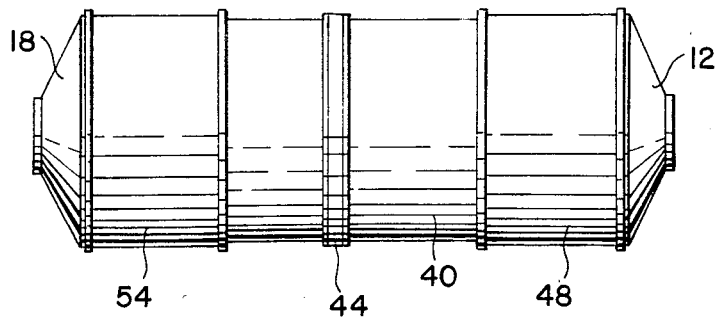
FIG. 8 is a perspective view of the embodiment illustrated in FIG. 7 of the Spacelab module in its expanded condition.

FIGS. 7 and 8 illustrate an alternate embodiment of the present invention which is based upon the same general concept as the embodiment illustrated in FIGS. 1-6. In this embodiment the telescoping members are the exterior cylinders, rather than interior cylinders, and only a single internal central shell is provided. Inner cylinder 40 is provided with a plurality of exteriorly directed flanges and two upwardly inturned flanges 42. Attached to the exterior surface of the inner shell is a spring biased, generally U-shaped clamping member 44, attached to a generally central portion of the shell by generally helical spring 46. When in its contracted position, as illustrated in FIG. 7, attaching flange 50 of forward outer cylinder 48 and flange 56 of aft outer cylinder 54 are maintained in abutment by the U-shaped portion of clamp 44. When the clamp is released, e.g., by manipulation of release latch 49, which extends through an opening in inner cylinder 40 and into the interior volume, outer cylinder 48 moves rightwardly and outer cylinder 54 leftwardly, as viewed in FIG. 7, until angled inturned flanges 42 engage angled portions of sealing flanges 52 and 53, respectively. When the clamp is released, the sections or cylinders 48 and 54 move outwardly to essentially double the volume of the space module in its contracted position, as is best illustrated in FIG. 8.

FIG. 9 illustrates another embodiment of the apparatus illustrated in FIG. 7. In this embodiment, forward and aft outer cylinders 48 and 54, respectively, are again capable of moving rightwardly and leftwardly as seen in FIG. 9. Rather than being maintained in abutment by a spring biased clamp 44, as in FIG. 7, hydraulic means are provided for releasably clamping the outer cylinders in the contracted position of the module. More particularly, as seen in FIG. 9, cylinder 48 is clamped onto inner cylinder 60 by hydraulic apparatus which includes support 64, a generally L-shaped pivoting arm 68, and a hydraulic cylinder 72. This apparatus is operable from inside the cabin by manual manipulation of switch 73 which is shown by way of example only. Similarly, outer cylinder 54 is maintained in its contracted position by a hydraulic apparatus which comprises support 62, generally L-shaped pivot arm 66, and hydraulic cylinder 70; this apparatus is operated, e.g., by switch 71 from inside the main cylinder.

Instead of the mechanical latching apparatus illustrated in FIG. 7 or the hydraulically operated cylinders, the latching mechanism can be operated pneumatically or in other conventional fashion.

FIG. 10 illustrates another embodiment of the expandable Spacelab module. In this embodiment, unlike the other devices, the Spacelab module is attached to the exteriorly radially directed flanges 20 of Spacelab shell 10. Connecting cap 80 is attached to the flanges, e.g., frictionally, by welding or rivets. This connecting cap provides an attaching device to which an expansion chamber 82 can be attached to increase the volume of the standard Spacelab module. The cap is attached to a flat hardware end and has complementary shaped means, e.g., annular spline lock portion 84 and male seal members 83, which are adapted to be connected to, e.g., female seal members 85 and locking spline portions 86 of the expansion chamber. In this way, by rotating the cap with respect to the expansion chamber, the conventional spline attaching elements can be detached, and the empty volume 82 removed. The module then again has its volume expanded by the connection of another, identical expandable volume 82 (not shown). The expandable volumes can be used, e.g., to carry additional loads, fuel, comestibles, or test equipment.

The present concept is not limited to the specific structures which have been shown. As seen in FIG. 3, the apparatus can be placed within cargo bay 32 of space shuttle 30. In this fashion, the expandable volume is originally positioned in the aft cargo compartment of the Space Shuttle and is extended outwardly from the compartment once in orbit. The expanded volume is designed so that it has a mass and density gradient with superior orbital characteristics. The expanding volume can serve as an unloading platform for orbiting shuttles, to assist in cargo transfer, space structure construction, and interplanetary vehicle assembly. The aft cargo compartment is attached to the external tank of the Space Shuttle.

The apparatus is naturally internally pressurized so that when the clamp or other latch mechanism is released the volume will expand to the desired capacity.

Although one space module is disclosed, in similar fashion any number of expandable chambers space modules can be attached to a single space module in a plurality of desired configurations.

Although the present invention has been described with respect to specific features, embodiments and advantages, it is clear that a variety of such embodiments, features and advantages can be contemplated within the scope of the present invention.

What is claimed is:

1. An expandable spacecraft module which comprises:
   (a) at least one main generally cylindrical body member, said body member comprising a waffle-type structure which includes a plurality of flanges extending generally radially outwardly from said cylinder;
   (b) an auxiliary housing which is adapted to increase the volume of said body member, and means for connecting said housing to said body member, said connecting means being attached to a plurality of flanges, said housing comprising a generally tubular portion attached to said connecting means, said connecting means in turn being attached to said outwardly extending flanges, wherein said connecting means comprises a cap attached to said outwardly extending flanges, said spacecraft module further comprising an annular spline joint which is adapted to releasably connect said cap to said cylinder; and (c) means for sealing said spacecraft module from the exterior of said module.

2. An expandable spacecraft module which comprises at least one main, generally cylindrical body member, said body member comprising a waffle-type structure which includes a plurality of flanges extending generally radially from said body member, each said body member comprising an aft end and a forward end, and an auxiliary housing which comprises at least one cylinder attached to the flanges at at least one of said ends, each said cylinder having a diameter which is smaller than the diameter of said main body member, being attached to flanges which extend inwardly from said main body, and being slidably and telescopically positioned within said main body member, each of said cylinders having an angled leg portion located at one end thereof and being connected to said main body member by an annular brace fastened to said flanges, each brace having an angled portion which is adapted to lockingly engage said angled leg when said cylinder is telescoped outwardly from said body in order to comprise means for securely increasing the volume of said spacecraft module, and means for sealing said module from the exterior of said module.

3. An expandable spacecraft module which comprises:

(a) at least one main generally cylindrical body member, said body member comprising a waffle-type structure which includes a plurality of flanges extending generally radially inwardly from an inner surface of said body member, said flanges being longitudinally spaced along said inner surface, each of said body members comprising an aft end and a forward end;

(b) an auxiliary housing which is slidably and telescopically positioned within said main body member and which is adapted to increase the volume of said body member, and means for connecting said housing to said body member, said connecting means attached to a plurality of said flanges, said housing comprising at least one cylinder attached to said inwardly directed flanges at at least one of said ends, each of said cylinders having a diameter smaller than the diameter of said main body member and adapted to be attached to said flanges which extend inwardly from said main body member; and (c) means for sealing said module from the exterior of said module.

4. An expandable spacecraft in accordance with claim 3 wherein each body member comprises an aft end and a forward end and wherein said housing comprises cylinders attached to flanges adjacent both of said ends.

5. An expandable spacecraft in accordance with claim 3 wherein each cylinder is slidably and telescopically positioned within said main body member, each cylinder having an angled leg portion at one end thereof.

6. An expandable spacecraft in accordance with claim 5 wherein each cylinder is connected to said main body by an annular brace fastened to said flanges, each brace including an angled portion adapted to lockingly engage said angled leg when said cylinder is telescoped outwardly from said body member to increase the volume of said module.

7. An expandable spacecraft in accordance with claim 6 further comprising a sealing gasket which abuts each cylinder and brace.

8. An expandable spacecraft in accordance with claim 7 wherein a second end of each cylinder is attached to a generally frustoconical cap having a base with substantially the same diameter as the body member.

9. An expandable spacecraft in accordance with claim 8 further comprising a clamp adapted to engage abutting exterior flanges on said cap and said body member when said device is in its contracted position, said clamp adapted to be removed to permit each cylinder to telescope outwardly so as to increase the volume of said module.

10. An expandable spacecraft in accordance with claim 3 wherein there are at least two body members, and wherein said body members are releasably attached by a clamp.

11. An expandable spacecraft in accordance with claim 10 wherein each body member has a generally outwardly directed radial closure flange, and when said module is in its contracted condition said closure flanges are maintained in abutment by said clamp, said clamp having a generally U-shaped configuration.

12. An expandable spacecraft in accordance with claim 11 wherein said auxiliary housing comprises a cylinder extending over the length of both of said body members, said auxiliary housing having a diameter smaller than the diameter of said body members, said cylinder engaging said members to permit slidable movement of said members over said cylinder when said clamp is released.

13. An expandable spacecraft in accordance with claim 12 wherein said cylinder has a forward and an aft end, each cylinder end having an angled foot portion.

14. An expandable spacecraft in accordance with claim 13 further comprising a brace attached to a flange on the interior of said housing, said brace including an angled portion adapted to engage one angled foot when said module is in its expanded condition.

15. An expandable spacecraft in accordance with claim 14 further comprising a release bar for unlatching said clamp to permit expansion of said module, said release bar being located within said auxiliary housing.

16. An expandable spacecraft in accordance with claim 15 wherein each body member has an outwardly directed flange engaged by a hydraulically operated locking lever.

17. An expandable spacecraft in accordance with claim 16 wherein said auxiliary housing comprises a cylinder extending over the length of said body members and having a diameter smaller than the diameter of said body members, said cylinder engaging said members to permit slidable movement of said members over said cylinder when said hydraulic locking levers are released.

18. An expandable spacecraft in accordance with claim 3 wherein said body member includes a plurality of flanges extending outwardly from said cylinder, said housing comprising a generally tubular portion attached to said connecting means, said connecting means being attached to said outwardly extending flanges.

19. An expandable spacecraft in accordance with claim 18 wherein said connecting means comprises a cap attached to said outwardly extending flanges, and wherein an annular spline joint is dapted to releasably connect said cap to said cylinder.

20. An expandable spacecraft in accordance with claim 3 wherein said sealing means comprises at least one generally annular gasket positioned adjacent said main body member and said auxiliary housing.

21. An expandable spacecraft in accordance with claim 3 wherein the interior of the body member is pressurized.

* * * * *